United States Patent [19]
Wilcock

[11] Patent Number: 5,083,589
[45] Date of Patent: Jan. 28, 1992

[54] LOW COST RETURN DIVERTER VALVE

[76] Inventor: Anthony C. Wilcock, 13358 Vally Vista Blvd., Sherman Oaks, Calif. 91423

[21] Appl. No.: 646,810

[22] Filed: Jan. 28, 1991

[51] Int. Cl.⁵ .............................. F16K 27/02
[52] U.S. Cl. .................. 137/625.29; 251/367; 251/155
[58] Field of Search ........... 251/366, 367, 155; 137/625.29

[56] References Cited

U.S. PATENT DOCUMENTS

| | | | |
|---|---|---|---|
| 2,301,176 | 11/1942 | Elliott | 251/366 X |
| 2,682,701 | 7/1954 | Pote | 251/366 X |
| 3,147,950 | 9/1964 | Milleville | 251/367 X |
| 4,588,164 | 5/1986 | Kemp | 251/367 X |

*Primary Examiner*—Arnold Rosenthal
*Attorney, Agent, or Firm*—William H. Maxwell

[57] ABSTRACT

A diverter-return body for a diverter valve directing water through a filter unit and characterized by low cost manufacture in its body of round configuration that minimizes machining and polishing, and assembled with a return coupling and mounted by a diverter coupling.

11 Claims, 2 Drawing Sheets

LOW COST RETURN DIVERTER VALVE

BACKGROUND OF THE INVENTION

This invention relates to a water faucet fitting used to divert water from an open faucet so as to be returned through a filter unit, it being a general object of this invention to reduce manufacturing costs thereof as much as possible. With the disparity between domestic and foreign labor costs it becomes extremely difficult for domestic manufacturers to be competitive when the product involved is labor intensive. Accordingly, it is an object of this invention to reduce the time involved in and/or to eliminate manufacturing steps that entail labor. In practice, the cost reduction can be as much as 80%.

In addition to the labor cost factor, the material cost factor is most important, it being an object to this invention to employ metal bar stock that is subject to minimized machining, as compared with prior art product of the same description that is subject to approximately twice the amount of machining. Also, the production machine tool operates with a conventional collet by practicing the present invention, rather than requiring special collets for prior art rectangular bar stock.

The prior art configurations of these by-pass bodies of such valves do not address the labor intensive processes of manufacture. On the contrary, unnecessary steps are executed in manufacture, which through careful analysis is shown to involve approximately 300 seconds labor in order to produce a single article, while the present invention involves the expenditure of but 60 seconds labor to a single article; said articles being substantially the same as will be shown. Therefore, at a labor cost of $0.008 per second, the prior art labor cost is $2.40, while this invention's labor cost is merely $0.48. It is to be understood that these figures are taken from actual production time studies.

In carrying out this invention, round bar stock is employed in order to minimize material cost, reducing the prior art material cost of $0.26 to $0.12. Machining time and waste is commensurately reduced. And further, round bar stock is less expensive than rectangular bar stock.

The return diverter valve is devised to direct faucet water through a filter unit and back to the discharge of the faucet, there being a filter screen at the faucet discharge. It is the filter screen fitting which is used herein to mount the return diverter valve characterized by its separate body with a diverter coupling connected by a hose to the filter unit and with a return coupling connected by a hose from the filter unit. Also, a discharge spout with a filter screen separate from that of the faucet discharge. A manual valve control is accessible at one side of the filter screen fitting that incorporates the diverter valve, as will be described. It is an object of this invention to provide a low cost return diverter valve having the aforesaid features and which is every bit as functional and durable as the prior art, but at a fraction of the cost. In carrying out this invention, the prior art faucet screen fitting and diverter valve remains the same as will be described, while the return diverter body, return coupling and discharge spout are of unique and improved configuration.

SUMMARY OF THE INVENTION

This invention resides in the unique configuration of a return body carried by a diverter valve mounted onto a filter screen unit of a water faucet, for directing the flow of water therefrom and through a filter unit or the like. Heretofore, such return bodies have been costly because of their labor intensive configurations "hogged", so to speak, from solid rectangular bar stock which is considerably more expensive that common round bar stock. Accordingly, this invention provides a unique return body configuration, discharge spout and return coupling configuration, whereby the finished product is no longer labor intensive. The structural configuration of this return body and spout in combination with a separate inexpensive return coupling is unique and highly utilitarian.

The foregoing and various other objects and features of this invention will be apparent and fully understood from the following detailed description of the typical preferred form and application thereof, throughout which description reference is made to the accompanying drawings.

THE DRAWINGS

PREFERRED EMBODIMENT

Figure 1:
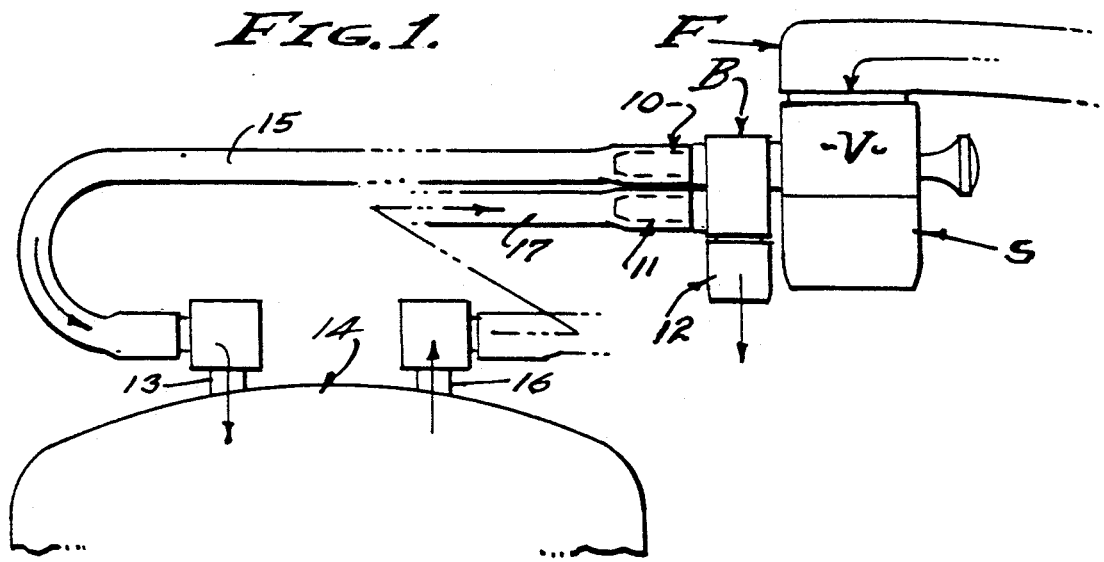
FIG. 1 is a view showing the installation of the return diverter valve of the present invention.

Referring now to the drawings, a practical application of this return diverter valve is shown in FIG. 1, wherein the diverter valve is incorporated in a filter screen unit S threadedly attached to a faucet F from which water normally flows when a valve (not shown) is opened. The diverter valve V includes a diverter coupling 10 carried by the filter screen unit S, and by which the diverter-return body B of the present invention is mounted, and characterized by a return coupling 11 carried by the body B in open communication with a discharge spout 12. The diverter coupling 10 is connected into the inlet 13 of a filter unit 14 by a hose 15, and the return coupling 11 is connected into the outlet 16 of said filter unit by a hose 17. As shown, the couplings 10 and 11 are typical hose couplings having dart-shaped circular ribs 18 that bite into and seal with the inner diameters of the hoses forced thereover. Accordingly, faucet water diverted by the diverter valve V through hose 15 is returned from the filter unit by the hose 17 and discharged from the spout 12.

Figure 2:
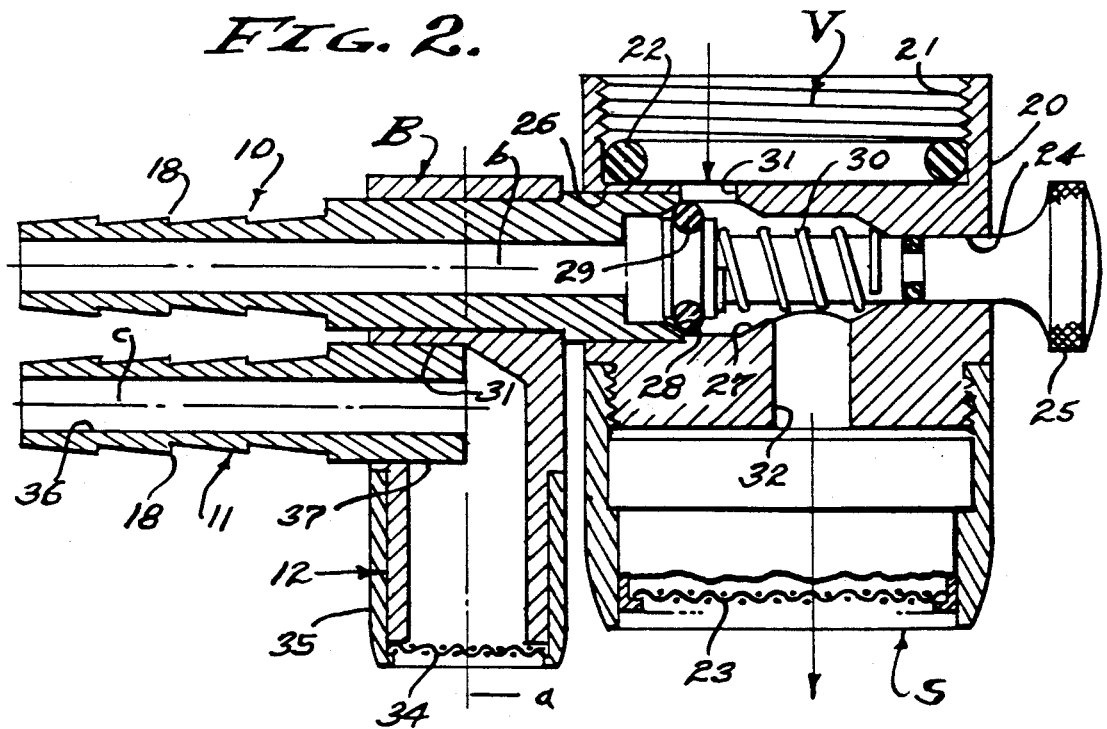
FIG. 2 is an enlarged sectional view of the return diverter valve removed from the installation of FIG. 1.

The filter screen unit S and diverter valve V is shown in FIG. 2 as comprised of a cylindrically shaped body 20 with internal threads 21 and a seal 22 fitted onto the faucet F. The upper portion of body 20 incorporates the diverter valve features, while its lower portion incorporates the filter discharge features (not shown) from which water normally flows through a screen 23 when the faucet valve (not shown) is opened. The upper portion of body 20 is counter-bored on a transverse axis b so as to provide a guide bore 24 for a valve member 25 slidable therethrough, and a chamber bore 26 for defining a diverter seat 27. The diverter coupling 10 is press fitted into the bore 26 against a step, its inner end forming a faucet seat 28 spaced from and opposed to the diverter seat 27. The valve member 25 carries an O-ring seal 29 that alternately engages the seats 27 and 28, there being a return spring 30 biasing the member 25 and seal 29 to engage the diverter seat. The chamber bore 26 receives inlet water from the faucet F through a port 31 intermediate the seats 27 and 28, and discharge of outlet water is behind the diverter seat 27 and through a port 32 into the filter portion of the body 20. When the faucet seat 28 is closed by seal 29 flow is through the body 20 and from the screen 23. When the diverter seat 27 is closed by seal 29 flow is diverted through the faucet seat 28 and diverter coupling 10.

Figure 4:
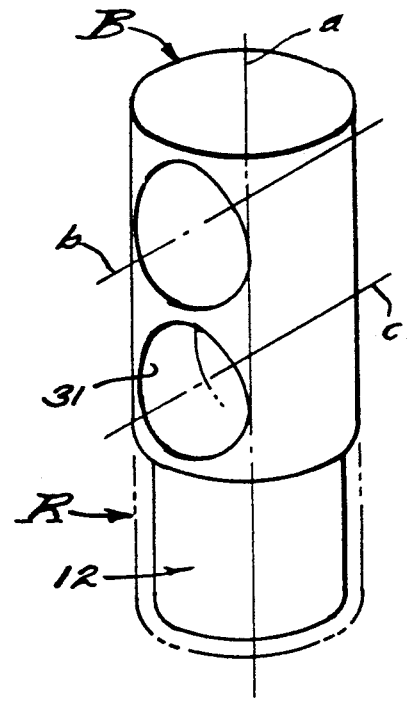

In accordance with this invention, the diverter-return body B is a turned part of round bar stock mounted upon the diverter coupling 10 which projects transversely therethrough, and that carries the return coupling 11 opening through the discharge spout 12. The inventive concept herein disclosed has to do with the extreme simplicity and practicality of the diverter-return body configuration, as best illustrated in FIG. 4, a body of round cylinder form turned about an axis a with minimum waste. Upon completion of the turning steps, the machine tool spindle is locked and two simple cross drilling steps are performed, one a straight through drilling on an upper transverse axis b, and the other a blind bore on a lower transverse axis c. The axes b and c are spaced and parallel as shown, without regard to the rotational locked position of the body B.

Figure 3:
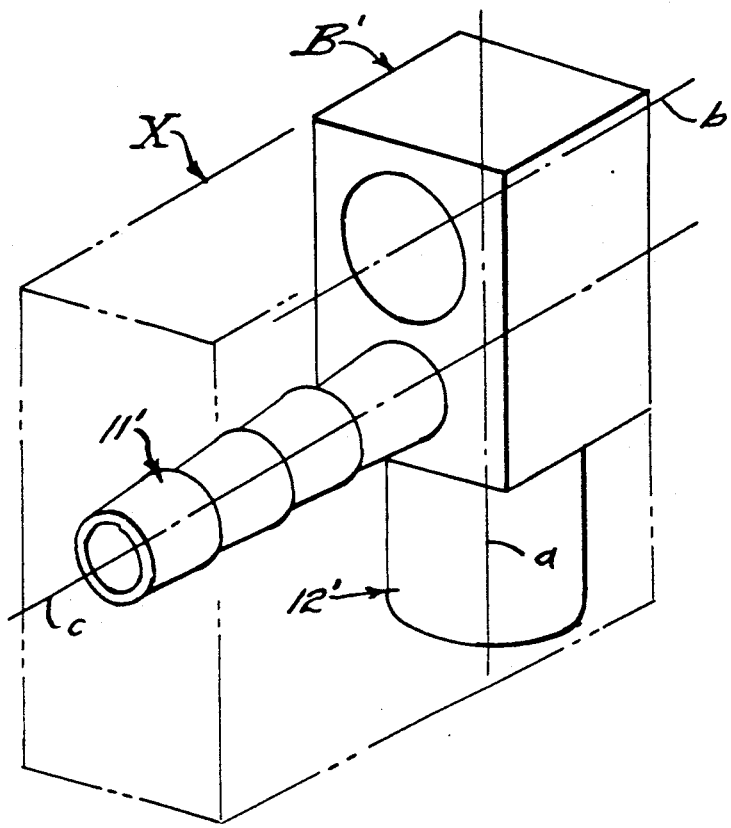
FIGS. 3 and 4 are perspective views, FIG. 3 showing a prior art diverter-return body, and FIG. 4 showing the diverter-return body of the present invention.
Figure 5:
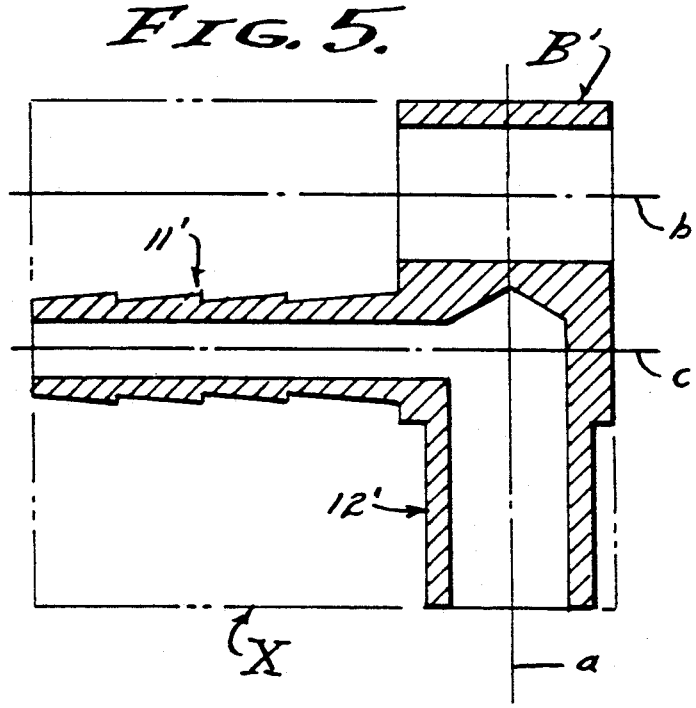
FIG. 5 and 6 are sectional views, FIG. 5 showing the prior art diverter-return body of FIG. 3, and FIG. 6 showing the diverter-return body of FIG. 4.

For comparison, the prior art diverter-return body B' as shown in FIGS. 3 and 5 is a part of rectangular bar stock X turned on both its transverse and then its longitudinal axis. A feature of the prior art diverter-return body is that the return coupling 11' is turned integrally with the body on a transverse axis, followed by a separate turning of the spout 12' on a longitudinal axis. As a result, approximately half of the bar stock material is removed as waste, and with a material cost differential of approximately two to one as compared to round bar stock (26¢ to 12¢), extremely wasteful as well as time consuming.

The eleven steps required to fabricate the prior art diverter-return body B' are as follows:

Step 1—Feed rectangular bar stock X through special chuck and to a stop.
Step 2—Turn exterior of return coupling 11' on a transverse axis c.
Step 3—Drill return hole on axis c.
Step 4—Cut off part.
Step 5—Rechuck part on longitudinal axis a.
Step 6—Turn exterior of spout 12'.
Step 7—Drill discharge hole on axis a.
Step 8—Chuck part in a fixture.
Step 9—Cross drill on axis b.
Step 10—Belt sand flat surfaces.
Step 11—Buffer wheel polish.

Analysis of the foregoing at $0.008 per second of labor time: The material cost is $0.26. Steps 1 through 4 involve 35 seconds at a cost of $0.28. Steps 5 to 7 involve 45 seconds at a cost of $0.36. Steps 8 and 9 involve 35 seconds at a cost of $0.28. Step 10 involves 90 seconds at a cost of $0.72. And step 11 involves 90 seconds at a cost of $0.72. Total prior art manufacturing time is 295 seconds at $2.36 plus $0.26 material for a total cost of $2.62.

Figure 6:
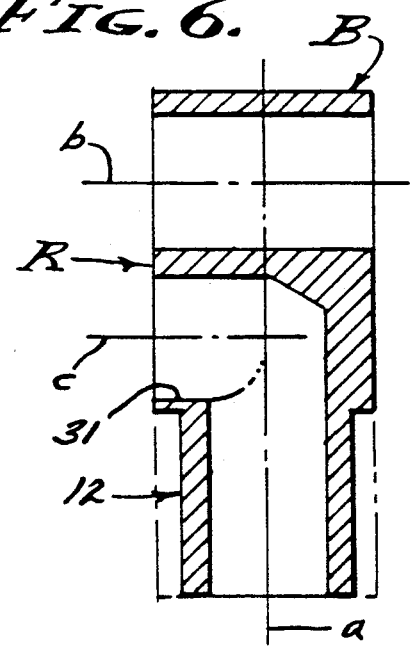

Referring now to the improved diverter-return body B as shown in FIGS. 4 and 6, the seven steps of fabrication are as follows:

Step 1—Feed round bar stock R through standard collet and to a stop.
Step 2—Drill spout inside diameter on center axis a.
Step 3—Turn spout outside diameter on center axis a.
Step 4—Cross through-drill on axis b.
Step 5—Cross bottom-drill on axis c.
Step 6—Vibra Hone polish.
Step 7—Press fit assembly with coupling 11.

In accordance with this invention, the return coupling 11 is a separate inexpensive part press fitted into the bottom-drilled hole on axis c so as to open into the spout 12. The discharge through spout 12 is through a screen 34 secured by a cover sleeve 35 pressed onto the turned exterior of the spout. The return coupling 11 has said dart-shaped circular ribs 18, a through bore 36 and a cylindrical boss 37 that is press fitted into the cross bore 31 bottom-drilled on axis c. In practice, this singular part involves $0.03 material, and $0.048 machining; a total part cost of $0.078.

Analysis of the foregoing at $0.008 per second of labor time: The material cost is $0.12. Steps 1 through 5 involve 35 seconds at a cost of $0.28. Step 6 involves 5 seconds at a cost of $0.04. Cost of coupling 11 is $0.78. And step 7 involves 20 seconds at a cost of $0.16. Total manufacturing time is 60 seconds at a cost of $0.48 plus the $0.078 coupling 11 and $0.12 material for a total cost of $0.678.

The foregoing is based upon actual manufacturing practice, realizing a three fold increase in profit over the prior art finished article, the cost of the present invention article being approximately one fourth that of the prior art. In other words, the article of the present invention at $0.678 is $1.942 less costly that the prior art article, or about 25% the cost of the prior art article.

Referring now to the prior art diverter-return body B' shown in FIG. 3, it will be observed that the rectangular bar stock material within the confines of the phantom lines represents about a third of the original volume of the stock. By contrast referring to the diverter-return body B of the present invention as it is shown in FIG. 4, it will be observed that the waste material within the confines of the phantom lines represents but a very small fraction of its original volume (less than 1/10). A feature of the present invention is that the outside diameter of the round bar stock is the finished diameter of the body B, which is batch polished by the Vibra Hone process at little cost ($0.04), after which the body B is press fitted with the coupling 11. The coupling 11 is not subjected to the dulling effects of polishing, so that the barbs 18 remain sharp and effective. The result is an extremely cost effective diverter-return body without detracting from its functional requirements.

Having described only the typical preferred form and application of my invention, I do not wish to be limited or restricted to the specific details herein set forth, but wish to reserve to myself any modifications or variations that may appear to those skilled in that art as set forth within the limits of the following claims.

I claim:

1. A diverter-return body mounted on a diverter coupling projecting from a diverter valve member diverting fluid through the diverter coupling, said diverter-return body being of round configuration with a longitudinally disposed discharge spout opening from one end and a transverse mounting opening through the other end and mountedly engaged over the diverter coupling entering one side of the diverter-return body and projecting from the other side thereof, and a return coupling fitted into a transverse bore in the diverter-return body and opening into the discharge spout for the discharge of returned fluid.

2. The diverter-return body and diverter coupling for discharge of return fluid from a diverter valve as set forth in claim 1, wherein the diverter-return body of round configuration is the finished diameter of said body.

3. The diverter-return body and diverter coupling for discharge of return fluid from a diverter valve as set forth in claim 1, wherein the diverter-return body of round configuration has a vibrahone finished diameter of said body.

4. The diverter-return body and diverter coupling for discharge of return fluid from a diverter valve as set forth in claim 1, wherein the diverter coupling is a hose coupling projecting from the transverse mounting opening through the diverter-return body.

5. The diverter-return body and diverter coupling for discharge of return fluid from a diverter valve as set forth in claim 1, wherein the diverter coupling is a barbed projecting through the diverter-return body.

6. The diverter-return body and diverter coupling for discharge or return fluid from a diverter valve as set forth in claim 1, wherein the diverter coupling is a hose coupling press fitted into and projecting from the transverse mounting opening through the diverter-return body.

7. The diverter-return body and diverter coupling for discharge of return fluid from a diverter valve as set forth in claim 1, wherein the return coupling is a hose coupling projecting from the transverse bore into which it is fitted in the diverter-return body.

8. The diverter-return body and diverter coupling for discharge of return fluid from a diverter valve as set forth in claim 1, wherein the return coupling is a barbed hose coupling projecting from the transverse bore into which it is fitted in the diverter-return body.

9. The diverter-return body and diverter coupling for discharge of return fluid from a diverter valve as set forth in claim 1, wherein the return coupling is press fitted into and projecting from the diverter-return body.

10. The diverter-return body and diverter coupling for discharge of return fluid from a diverter valve as set forth in claim 1, wherein the transverse mounting opening and transverse bore in the diverter-body are on spaced and parallel axes.

11. The diverter-return body and diverter coupling for discharge of return fluid from a diverter valve as set forth in claim 1, wherein the transverse mounting opening and transverse bore in the diverter body are on spaced and parallel axes intersecting a longitudinal axis of the diverter-return body.

* * * * *